(12) United States Patent  
Galstian et al.

(10) Patent No.: US 8,629,932 B2  
(45) Date of Patent: Jan. 14, 2014

(54) AUTOFOCUS SYSTEM AND METHOD

(75) Inventors: Tigran Galstian, Quebec (CA); Peter P. Clark, Boxborough, MA (US); Thomas Charles Antognini, Lexington, MA (US); Jeffrey James Parker, Millis, MA (US); Derek Alexandre Proudian, Palo Alto, CA (US); Thomas Edwin Killick, Danville, CA (US); Armen Zohrabyan, Quebec (CA)

(73) Assignee: Lensvector, Inc., Mountain View, CA (US)

( * ) Notice: Subject to any disclaimer, the term of this patent is extended or adjusted under 35 U.S.C. 154(b) by 431 days.

(21) Appl. No.: 12/542,458

(22) Filed: Aug. 17, 2009

(65) Prior Publication Data

US 2010/0039532 A1      Feb. 18, 2010

Related U.S. Application Data

(60) Provisional application No. 61/089,821, filed on Aug. 18, 2008.

(51) Int. Cl.
   *G03B 13/00* (2006.01)
   *H04N 5/232* (2006.01)
   *G02F 1/13* (2006.01)
   *G03B 3/00* (2006.01)
   *G03B 13/18* (2006.01)
   *G03B 13/32* (2006.01)

(52) U.S. Cl.
   USPC ............................. 348/349; 349/200; 396/89

(58) Field of Classification Search
   USPC ........ 348/345–357; 396/89–152; 349/33, 200
   See application file for complete search history.

(56) References Cited

U.S. PATENT DOCUMENTS

| | | | | |
|---|---|---|---|---|
| 6,166,784 | A * | 12/2000 | Murata et al. | 349/1 |
| 7,683,975 | B2 * | 3/2010 | Kageyama | 349/33 |
| 7,986,178 | B2 * | 7/2011 | Lynch | 327/172 |
| 2005/0225877 | A1 * | 10/2005 | Tang | 359/721 |
| 2007/0268417 | A1 * | 11/2007 | Kato et al. | 349/13 |
| 2007/0279365 | A1 * | 12/2007 | Kageyama | 345/100 |
| 2007/0279539 | A1 | 12/2007 | Suzuki et al. | |
| 2008/0088756 | A1 | 4/2008 | Tseng et al. | |
| 2008/0225404 | A1 * | 9/2008 | Tang | 359/666 |
| 2008/0239136 | A1 * | 10/2008 | Kanai et al. | 348/340 |
| 2009/0021823 | A1 * | 1/2009 | Heim et al. | 359/290 |
| 2009/0128922 | A1 * | 5/2009 | Justis et al. | 359/666 |

* cited by examiner

*Primary Examiner* — Sinh Tran
*Assistant Examiner* — Christopher K Peterson
(74) *Attorney, Agent, or Firm* — DLA Piper LLP (US)

(57) ABSTRACT

A camera module and method for focusing a tunable lens configured to continuously vary its optical power in response to a drive signal. A drive circuit generates the drive signal so that the tunable lens performs a continuous scan of its optical power. An image sensor is configured to acquire light images passing through the tunable lens, and to convert the light images to image signals during the continuous scan. A processor is configured to generate focus scores of the acquired light images using the image signals during the continuous scan. The processor is configured to determine from the focus scores a peak focus score achieved or achievable, and to instruct the drive circuit to adjust the drive signal so that the tunable lens settles at a value of the optical power that corresponds to the peak focus score.

40 Claims, 4 Drawing Sheets

AUTOFOCUS SYSTEM AND METHOD

RELATED APPLICATIONS

This application claims the benefit of U.S. Provisional Application No. 61/089,821, filed Aug. 18, 2008, and which is incorporated herein by reference.

FIELD OF THE INVENTION

The present invention relates to autofocus systems and methods for continuously tunable lenses.

BACKGROUND OF THE INVENTION

Autofocus (AF) is a process implemented in many camera systems to enable easier focus for users of cameras, sparing them the need to focus manually on objects in their field of view. There are a variety of methods of autofocus, some of them involving technology to assess object distance via sound, laser light, or a number of other methods. The autofocus technology of the present invention involves the use of so-called focus scores.

Focus scores, which are derived directly from images taken by the camera, are produced in a number of ways, well known to those versed in the art. Typically focus scores will reflect the "sharpness" of an image: by noting local regions of great contrast where the transition is especially abrupt. Generally, the filters that calculate focus scores attempt to ignore what is merely noise in the image, since, especially on a pixel to pixel basis, that noise may look like a very sharp transition. Moreover, the filters may attempt to emphasize features that are of greatest interest to the user of the camera—for example, some filters attempt to emphasize transitions to be found in faces. Typically, too, the filters will attend to vertical edges in an image, because scan lines in a sensor are organized horizontally, and so vertical edges are the ones that will show up in filters applied to those horizontal lines.

AF systems are used with both movable lens systems (where the optical power of the lens system is changed by physically moving one or more lenses in the lens system) as well as tunable lenses (where the optical power of the lens is changed by applying an electric voltage or pulse to the lens). Optical power of a lens refers to the amount of focusing (e.g. convergence) that the lens imparts on light (or more specifically a light image) passing therethrough. An example of tunable lenses (TLs) is the Tunable Liquid Crystal Lens (TLCL). A TLCL is a device in which liquid crystal is employed to create the effect of a lens via electrical stimulus (see later) and can be tuned to different levels in a range of optical power by adjusting that electrical stimulus. A TLCL achieves the effect of a lens by creating regions of differing indices of refraction in a liquid crystal when subjected to electrical stimulus (such as a Gradient Index Lens). The TLCL can be adjusted to different levels in a range of optical power by manipulating, for example, the voltages of electrical signal applied to the lens.

There are a number of standard algorithmic techniques that can be employed to converge on the optical power setting with the best focus scores for a given scene. They include the so called fill search (staircase), coarse and fine search (dual staircase), and hill climb.

The full search algorithm, also called the staircase algorithm, involves control of the tunable lens across its full range of optical power in small and even steps, where the focus scores are determined and recorded for each step. Then, the peak of the focus scores is determined, and the optical power of the tunable lens is adjusted to correspond to that for the peak focus score. This technique is referred to as staircase, because the steps up and down in the optical power resembles a staircase. One drawback to this algorithm is that it can be slow to implement, because each small step requires a non-trivial amount of time to complete, and the sheer number of steps in aggregate can add up to a sizable amount of time.

A somewhat similar approach in terms of overall effect is the coarse search/fine search algorithm, also called the dual staircase algorithm. This approach involves the use of a coarse search across the entire optical range of the tunable lens using relatively large, few and even steps, and determining in which region the peak focus score must exist. Then, a fine search is made within just that region using small and even steps to determine the optical power that corresponds to the peak focus score. The tunable lens is then adjusted to that optical power. This technique is referred to as dual staircase algorithm because it involves a coarse staircase search across the entire optical range, followed by a fine staircase search within just that smaller region determined to contain the peak of focus scores.

The hill climbing algorithm is another technique for detecting which optical power setting corresponds to the peak focus score. This technique assumes that there will be one peak in the focus score curve, which is considered a safe assumption in virtually all scenes naturally occurring in consumer photography and video. An hill climbing algorithm is illustrated in FIGS. 1A and 1B, and involves stepping through the optical range of the lens while detecting the climb up a hill in terms of focus scores, and then, immediately after the peak is passed (indicated by a drop in the focus scores), pulling back to the level of optical power at the observed focus score peak.

The general virtue to the hill climbing algorithm is that it involves fewer steps in most cases. Because it stops immediately after the peak of focus scores is passed, the number of steps can be greatly reduced compared, say, to a staircase method which involves going across the entire optical range before retreating to the calculated peak. The hill climbing algorithm could be particularly faster in cases in which the speed in adjusting optical power forward is much faster than the speed in adjusting optical power backward, as well as those cases where the peak focus score is associated with an optical power near the beginning of the focus scan (e.g. the focus score's maximum is situated in the beginning of focus score versus optical power curve). One approach to the hill climb technique involves selecting nearly equally spaced samples across the optical range. This is illustrated in FIG. 1. However, there are more optimal ways in which to space these samples. Because the hill climb approach essentially stops and retreats a bit after it passes over the peak, the amount of time it takes to engage in this procedure depends on how far across the optical range the peak is located. If the peak is near the beginning of the optical range, the procedure will only involve a few steps. But, if the peak is near the end of the optical range, the procedure will involve many steps. Therefore, to reduce the amount of time the entire procedure takes on average, it is preferable to make the steps at the beginning larger than those later in the procedure, as illustrated in FIG. 1B. Far few steps are taken to reach peaks positioned further away from the beginning of the optical range, thus taking less time to complete the entire procedure. In those cases where the peaks are positioned nearer the beginning of the optical range, additional time may be taken to perform larger backwards steps, but this is acceptable because the procedure will have spent relatively little time traveling to that early position. An important constraint on autofocus is the maximum time it takes. So long as the process takes less than some stipulated maximum time, it is generally considered acceptable if it takes close to that amount of time even for focusing procedures involving peaks near the beginning of the optical range.

For some autofocus applications, such as certain camera systems requiring exceptional autofocus speed performance, the staircase, dual staircase, and hill climb procedures that use a step-by-step approach in traveling across the optical range are too slow. There is a need for tunable lenses and systems which provide faster and better performance than that provided by conventional autofocus techniques.

BRIEF SUMMARY OF THE INVENTION

A camera module that provides faster and better performance than that provided by conventional autofocus techniques includes a tunable lens configured to continuously vary an optical power thereof in response to a drive signal, a drive circuit for generating the drive signal so that the tunable lens performs a continuous scan of the optical power, an image sensor configured to acquire light images passing through the tunable lens and to convert the light images to image signals during the continuous scan, and a processor for generating focus scores of the acquired light images using the image signals during the continuous scan.

A method of operating a camera module that provides faster and better performance than that provided by conventional autofocus techniques includes providing a tunable lens configured to continuously vary an optical power thereof in response to a drive signal, generating the drive signal using a drive circuit so that the tunable lens performs a continuous scan of the optical power, acquiring light images passing through the tunable lens and converting the light images to image signals during the continuous scan using an image sensor, and generating focus scores of the acquired light images using a processor and the image signals during the continuous scan.

Other objects and features of the present invention will become apparent by a review of the specification, claims and appended figures.

DETAILED DESCRIPTION OF THE INVENTION

The present invention is a technique that allows a continuous progress across the optical range of a tunable lens, which is referred to herein as the "in flight" technique or mode. This technique is suited to achieve fast autofocus performance.

Tunable lenses (TLs) are optical devices that exhibit an optical (focusing) power that varies with a varying input excitation signal. Certain tunable lenses (TLs) exhibit low and acceptable aberration levels when continuously changing their optical power. For this type of TL (referred to herein as "continuously TL", or CTL), a continuous in-flight autofocus (IFAF) search algorithm is ideal. An example of such TLs is the Tunable Liquid Crystal Lens (TLCL), which are known in the art. While the in flight autofocus invention is described herein with respect to TLCL tunable lenses, it generally applies to any appropriate CTL.

Figure 1A:
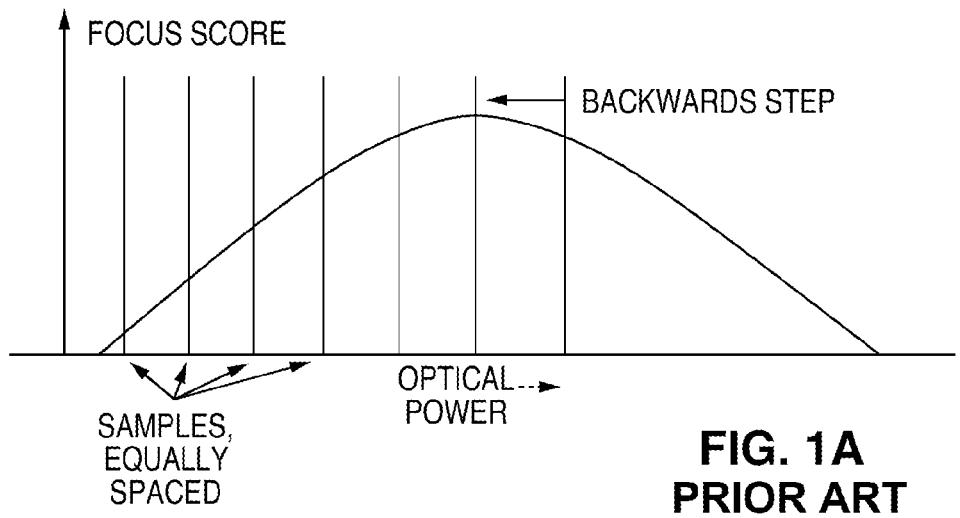
FIG. 1A is a graph illustrating the hill climb focus scan technique with evenly spaced samples across the optical range.
Figure 1B:
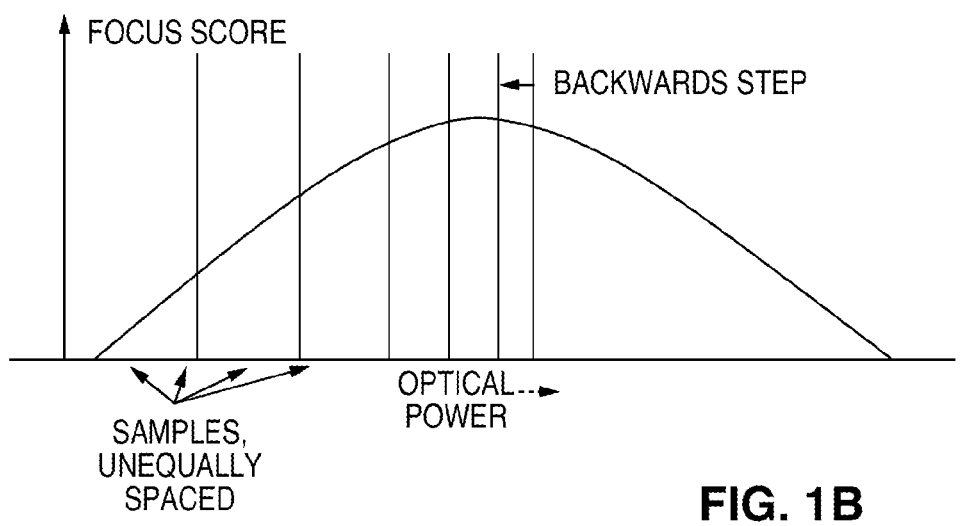
FIG. 1B is a graph illustrating the hill climb focus scan technique with unequally spaced samples across the optical range.
Figure 2:
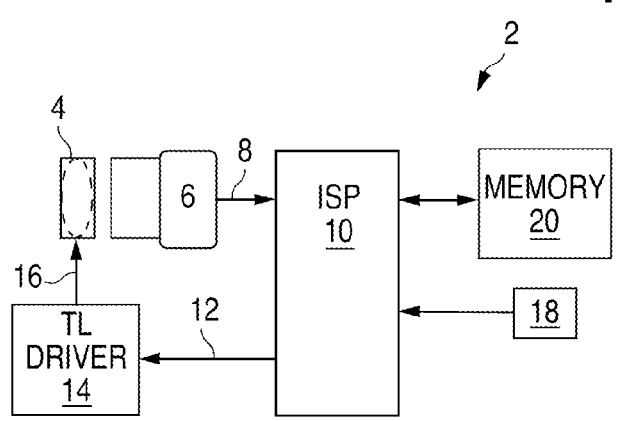
FIG. 2 is a plan view illustrating the components of a camera module incorporating a continuously tunable lens.

A camera module 2 incorporating TLCL 4 is illustrated in FIG. 2. Light is focused by TLCL 4 onto a photosensitive sensor 6 (image sensor), which captures the light image and converts it to an electrical (image) signal 8. The image signal 8 is used by conventional camera components (not shown) to generate, display and/or store the captured image. Signal 8 is also supplied to an imaging signal processor (ISP) 10 to control TLCL 4. ISP 10 is preferably a semiconductor device that can formed on the same chip or different chip than the photosensitive sensor 6. ISP 10 calculates focus scores based upon the received image signal 8, and uses an autofocus algorithm with those focus scores as an input to generate change commands 12. The change commands 12 are sent to the TL driver or driver circuit 14 (to instruct the driver to change the optical power of tunable lens TLCL 4 in a specific way, as the autofocus process requires). The TL driver 14 translates the change commands 12 (typically via a set of calculations and/or stored look-up tables) into a drive signal 16 that drives the focusing power of the TLCL 4. It is possible that the TL driver 14 can consider additional inputs (e.g. additional sensors) in generating the drive signal 16. It is also possible that the conversion of change commands to electronic signals is performed by the processor 10, in which case signal 12 is an electrical signal. It is even possible to have the TL driver 14 be integrally formed on the same chip as the processor 10. The feedback loop of generating focus scores, change commands and drive signals to induce changes in the optical power of the TLCL iterates until finally the autofocus process converges on an acceptable optical (focus) power.

Drive signal 16 can include a variety of electrical parameters used to control the optical characteristics (e.g. focusing power) of the TLCL 4. As used herein, the vector of such parameters affecting the TLCL 4 is referred to as the "control vector". Each such control vector occupies a point in an n-dimensional control space, with each n-dimension corresponding to a different electrical parameter affecting the TLCL optical power. One such electrical parameter is voltage. Other electrical parameters (separately or in combination) could include drive signal frequency, pulse duration, signal duration, signal modulation (e.g. Amplitude Modulation (AM), Pulse Width Modulation (PWM), Frequency Modulation (FM)), and/or any other frequency composition or duty cycle parameter. Therefore, the term "control vectors" describes the group of electrical parameters, and the term "control regime" describes this control space (which is used to control the TLCL).

Figure 3:
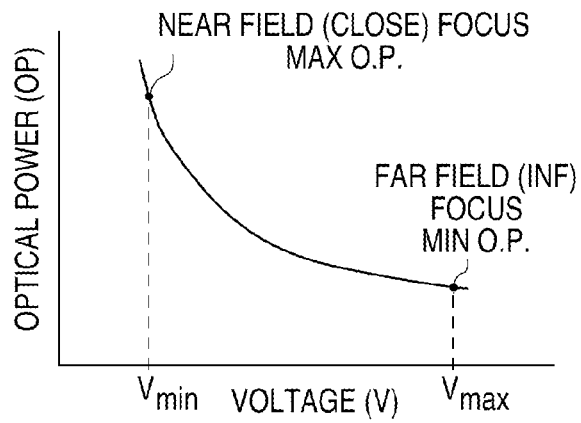
FIG. 3 is a graph illustrating an example of the transfer function (optical power as function of drive voltage) for a continuously tunable lens.

The basic behavior of the TLCL 4 is illustrated in the exemplary transfer function in FIG. 3, which maps a control vector (in this example—voltage levels) to levels of optical power. It is important, however, to note that in some cases changes in a control vector with additional parameters may likewise induce a useful transfer function. Similar transfer functions exist for parameters such as frequency instead of voltage, or the even the combination of the both.

The transfer function of FIG. 3 represents the levels of optical power reached after a period of stabilization at a given RMS voltage. (Likewise, if one is using a different kind of control vector than voltage, a transfer function will represent optical power after a period of stabilization to that control vector). What FIG. 3 does not indicate is the dynamic behavior of the TLCL 4 with respect to optical power as the lens drive voltage changes from one voltage level to another. Since autofocusing (or even simply traveling from far field focus to near field focus) involves a change in optical power, that dynamic behavior is important to the effectiveness of the TLCL system in cameras.

In addition, the transfer function does not capture the full range of relevant optical behavior in the TLCL. Beyond the level of optical power, in terms of diopters, the TLCL also must exhibit good behavior in terms of optical aberrations apart from defocus, as well as sharp, well contrasted images, such as would be reflected in a Modulation Transfer Function (MTF). From the standpoint of a camera system, all of these metrics need to be working at a sufficient level, and responding with sufficient speed, for the camera system to be considered well functioning. The simplest and most direct method to change TLCL 4 from one optical power level to another is just to determine the targeted optical power level, look to the transfer function to see what stable control vector corresponds to that optical power, and then apply the drive voltage that corresponds to the stable control vector. However, it may be necessary to step thru a sequence of control vectors to increase speed performance, and/or account for any dynamic behavior of TLCL 4 in order to converge towards a desired voltage and hence optical power level.

TLCLs are ideal focusing devices for continuous optical power adjustment, because TLCLs can take acceptable pictures while actively changing optical power. That is, while the TLCL is sweeping across the optical range in a continuous fashion (for example in the "quasi-stationary" mode of variations), the optical properties of the TLCL are good enough that images may be acquired in this process and used either by the user or to determine such things as focus scores and time values (or control vectors) when such scores or values are achieved. This is unlike many mechanical autofocus systems, in which lens movements require stabilization time at any given optical power, sometimes quite significant in duration, before acceptable images can be acquired.

The activation of the TLCL so that it sweeps across its optical range in one continuous optical power adjustment is referred to herein as the "in flight" mode of the AF process. In flight autofocusing includes a continuous change, sweep, travel, adjustment, etc. in terms of optical power, which preferably comes to a halt once the AF system determines that the optical power producing the best focused image has been reached and/or somewhat passed. The nature of the continuous change in optical power can be configured in a variety of ways to suit various purposes (e.g. linear change across the optical range when mapped against time, non-linear change matching a desired curve, change designed to optimize the time needed to sweep across the optical range, etc.).

There are characteristics of TLCLs that are relevant to the operation of AF systems. First, TLCLs exhibit no significant hysteresis, which is a significant advantage over many other autofocus systems including most mechanical systems, because the TLCL will go to the same stable level no matter from which direction that level is approached (i.e. no matter from what optical power level the TLCL starts its change, whether it be lower in optical power, or greater in optical power), and regardless of any previous changes. This means that once an optical power level is passed, no excessively large amount of "backtracking" in terms of control vector and/or optical power is necessary (e.g. no need to "reset" the system so that it can proceed to a targeted level). Second, TLCLs often times exhibit significant asymmetry in terms of how quickly they travel in one direction through the optical range as opposed to the other direction. This asymmetry in speeds in the two directions, when present, means that the AF system preferably should take maximum advantage of the fast direction, and should minimize the use of the slower direction.

One technique to speed up the response of a TLCL is the use of so-called overdrives and underdrives. An example of overdrive is the temporary application of a drive voltage or frequency that is different (typically, greater) than the targeted stable drive voltage or frequency. An example of underdrive is the temporary application of a drive voltage or frequency less than the targeted stable drive voltage or frequency (including zero volts). The use of overdrives or underdrives speeds the alignment of the molecules in a TLCL from a level corresponding to one stable voltage to that of another stable voltage, compared to simply applying the stable target drive voltage/frequency and allowing the TLCL to stabilize as determined by that value. In the case of a voltage control (of the TLCL), typically, the overdrive will have more energy than the targeted stable control vector, and the underdrive less energy than the targeted stable control vector. In the case of frequency control (of the TLCL), the underdrive and overdrive may, for example, have different frequencies and different RMS voltages. As the TLCL approaches the targeted optical power, the overdrive or underdrive is removed (or reduced), and eventually the stable targeted drive voltage or frequency is applied so that the TLCL stabilizes at the targeted optical power. The use of overdrives and underdrives (when properly calibrated) can be very effective in speeding up the response of certain TLCL.

Another technique to speed up the response of a TLCL is based on the use of so called "dual frequency" liquid crystals. In these kinds of liquid crystals, the molecules have the tendency to align parallel or perpendicular to applied electric field depending upon the frequency of that field. In this case, the liquid crystal axis is typically "attracted" towards the electric field for low frequencies of the driving field (positive dielectric anisotropy of the liquid crystal) while the axis is "repulsed" from the electric field for higher drive field frequencies (negative dielectric anisotropy of the liquid crystal). Thus, for both directions, the dual frequency liquid crystal exhibits quick response times, especially when the above described overdrive technique is used to speed up the liquid crystal molecule response (and hence reduce the response time of lens during the auto focus process).

For "in flight" autofocusing, there preferably is a prescribed table of one or more sequences of control vectors that is designed to take the TLCL (and CTL in general) across the optical range, also called "sweep", in an optimal continuous fashion. Such control vectors can be referred to as a "sweep regime" or "sweep drive regime". It is preferable but not necessary to synchronize the in flight sweep regime with the rate at which the image frames are captured by the photosensitive sensor 6, and hence the rate at which the focus scores are generated. The AF system will select entries from this table based on focus scores generated so far. Throughout the forward travel phase of the AF process, the table entries will cause the TLCL to travel across the optical range in a prescribed fashion, while focus scores are recorded and analyzed to determine the peak focal score. When the AF system determines that the peak of the focus scores has been reached or passed, the table entries will cause the TLCL to cease its sweep and immediately travel to the optical power corresponding to the determined peak focus score. Alternately, the table entries could cause the TLCL to complete its entire sweep across the optical power range before causing the TLCL to converge on the optical power corresponding to the determined peak focal score. Other continuous sweep strategies can be employed as well, including continuous predictive hill-climb and continuous course/fine searching. Other predictive shortcuts may be employed as well. In any case, there is a point at which a decision is made as to the optimal point of optical power, based on focus scores generated so far, and the previous adjustments across the optical range. In each case, the final step is to travel from a current optical power level to that which corresponds to the peak of the focus scores as quickly as possible. This may involve the use of overdrive and/or underdrive control vectors to speed that transition.

Depending upon the search algorithm used, the in-flight AF system will utilize different appropriate sweep drive regime(s). One exemplary search drive regime changes the lens between two optical power points in a continuous fashion using a sequence of control vectors that allows the change in optical power in both increasing and decreasing directions (to allow backward-forward travel) or in just one direction (to allow one-way travel only). This sweep may also be designed to travel between the optical power points in a known time interval. A second exemplary search drive regime modifies the optical power in a quasi static regime using a sequence of control vectors where the convergence to the desired optical power can be achieved by stabilizing the "just-past" control vector, which has just generated the highest past focus score. A third exemplary search drive (transient) regime uses a sequence of control vectors for lens-tuning in increasing or decreasing directions of optical power, where a specific sequence of control vectors is applied to converge towards the optimal optical power once the corresponding focus scores are generated.

In flight AF systems can be implemented in cameras in several ways. Before the camera is turned on, the lens is preferably focused on far field objects. In some TLCL configurations, the far field can be either at 0V (no drive voltage applied) or at a low-frequency excitation state, or at Max Voltage applied (corresponding to the minimum optical power). Configuring TLCLs in this way allows 0V to be used as a preview mode, drawing minimal power in its use in preview mode, which is likely to be by a good amount the most used mode for the camera when turned on. The focus search may start from minimum or maximum peak optical power (corresponding to near field focus). In cases in which 0V is preview mode, the transition to peak optical power may be performed by using specific control vector sequence to avoid declinations and to provide fastest possible transition.

Predictive search algorithms can be implemented in in-flight AF systems to further enhance performance. One example is a predictive hill climbing algorithm. As noted above, the (non-predictive) hill climbing algorithm involves stepping through the optical range of the lens, noting the climb up a hill in terms of focus scores (which are determined by the sharpness of an image—typically using vertical edge detection algorithms), and then, immediately after the peak focus score is passed (indicated by a drop in the focus scores), pulling back to the level of optical power at the peak observed focus score. The drawback with non-predictive hill climbing algorithms (other than they have typically been implemented using stepped changes in optical power as opposed to continuous optical power adjustment) is that it causes the system to overshoot the desired optical power and then backtrack to that optical power point. A predictive hill climbing algorithm converges on the desired optical power (with the highest focus score) without overshoot and backtracking, thus reducing autofocus convergence time. This type of predictive algorithm is especially appropriate for a class of TLCLs that can travel across a range of optical power significantly more rapidly in one direction (for example, going from high optical power to low optical power—which can be referred to as the "excitation" direction or mode) compared to the reverse direction (which can be referred to as the "relaxation" direction or mode).

The predictive algorithm for autofocus operates by taking a sampling of focus scores across the optical range of the variable focus lens, and then, based on those points, and general behavior expected of focus score curves, predicting the peak of the focus scores before that optical power is reached. In the case of the predictive hill climbing algorithm, the system gathers the focus score samples only on the rising side of the peak, and then predicts the peak as it approaches the peak. The focus score curves typically allow such predictions, because the slope of the tangent to the curve starts to reduce significantly as the system approaches the peak of the curve, approaching zero as the curve comes to the peak. It is possible to take samples at smaller intervals as the slope of the tangent goes down, until the system produces enough fine grained information to predict the peak before the optical power is adjusted to the other side of the peak.

With the in flight AF system, the speed of the scan can be an important factor. For example, an in flight process could involved setting the TLCL to the lowest optical power, and allowing the TLCL to sweep quickly across the optical range. A major difficulty with this approach, however, is that the transition would simply be too fast for most camera sensors to do an adequate job in acquiring enough focus scores that the peak of focus scores could readily be detected (and/or predicted) and the transition to the peak be quickly achieved by relaxing back to the calculated peak. For example, it may take only 200 ms for some TLCLs to travel across the entire optical range from peak optical power to minimum optical power. If the camera sensor achieves frame rates in the worst case of only 15 frames per second, then each frame requires 66 ms. This means only 3 or 4 focus scores could be acquired across the full optical range. Such a sparse sampling might easily miss the peak of focus scores, since sometimes the hill around that peak can be fairly narrow. With a camera sensor of this or similar speeds, it is preferable to stretch the time it takes to travel across the optical power range so that more focus scores can be recorded, and a finer grain analysis of the focus score curve can be obtained.

It is also preferable that, as one plots optical power against time in this transition, the curve so described is roughly linear. If the curve deviates significantly from a linear curve, much the same problem will result as with a too fast progress across optical power, in which, for at least some portion of the curve, the slope will be so steep that at a fixed frame rate, the samples will be too far away from each other in terms of optical power to detect the peak of focus scores and quickly predict or return to the peak of the focus scores. These concepts are illustrated in FIGS. 4-6.

Figure 4:
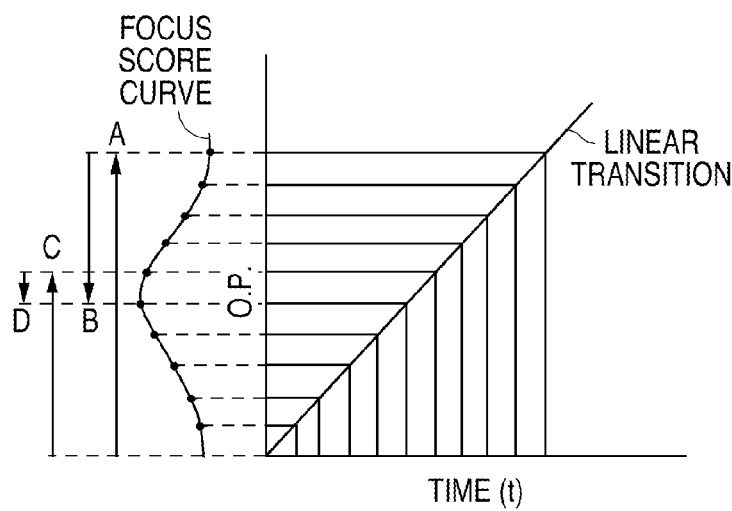
FIG. 4 is a graph illustrating a linear progression of optical power over time, and the corresponding focus scores for a middle field object.

FIG. 4 shows how an "in flight" activation of the TLCL 5 which engenders a linear progression across the range of optical power might behave with respect to sampling focus scores. Each vertical line represents a frame and focus score. The curve to the left is the curve of focus scores for a middle field object as the scan proceeds across the range of optical power, and is mapped to the optical powers achieved when the frames are captured. As is evident in this linear progression case, the sampling is fairly dense at all regions of the focus score curve, allowing the AF algorithm to have an accurate notion of how the curve is shaped, and where the exact peak of the curve is. Moreover, the need for relaxation is minimized because the gaps between the samples are relatively small. Arrow A illustrates an initial fill sweep across the optical range, which is followed by the travel back to the optical power corresponding to the determined peak focus score as illustrated by arrow B. Alternately, arrow C illustrates an initial sweep across the optical range until the focus scores start dropping, at which point the sweep is ceased and is followed by the travel back to the optical power corresponding to the determined peak focus score as illustrated by arrow D.

Figure 5:
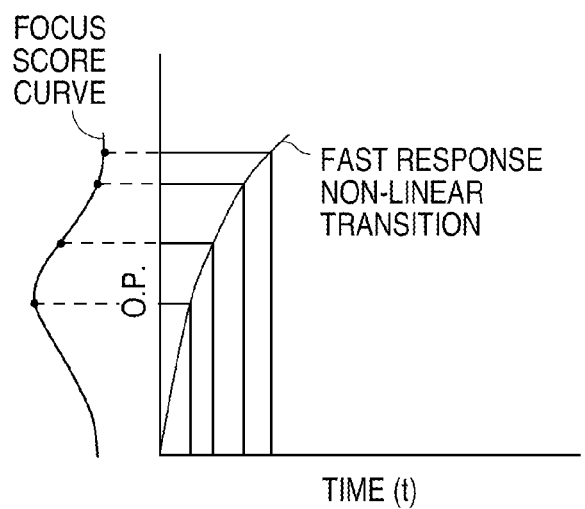
FIG. 5 is a graph illustrating a fast response non-linear progression of optical power over time, and the corresponding focus scores for a middle field object.

FIG. 5 represents a case in which the progress across the optical range is very fast (i.e. as fast as a high energy electrical pulse might drive the TLCL across the optical range). The curve is both very short in duration, and also quite deviant from linear. It is similarly mapped across to the samples represented in the focus score curve. It is obvious that the samples are both very sparsely populated and unevenly distributed. It would be very difficult for an AF algorithm to determine the peak of focus scores. Even if it could determine that peak, it would likely require significant relaxation time.

Figure 6:
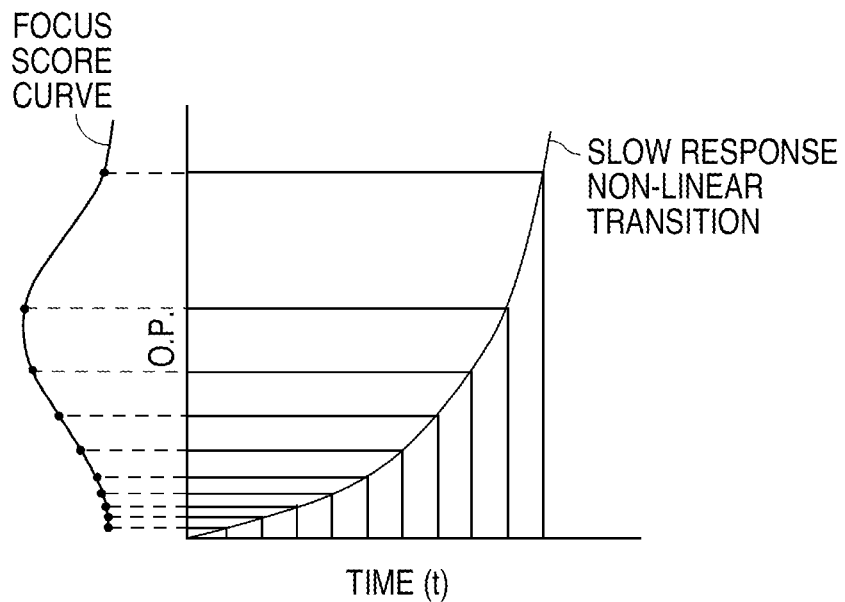
FIG. 6 is a graph illustrating a slow response non-linear progression of optical power over time, and the corresponding focus scores for a middle field object.

FIG. 6 represents a case in which the curve takes the same amount of time to cross the optical range as the linear curve, but where there's significant deviation from the linear approach. Here the sampling, while equal in numbers to the linear case, is very unevenly distributed across the focus score curve. This too creates a situation in which it may be difficult for the AF algorithm to determine the peak, and may take considerable time relaxing back to whatever point of optimal focus is settled upon.

It is important to note that the in flight mode is configurable to proceed across the optical range at any desired time period. The shape of the optical power curve is likewise configurable to become linear or any other desired shape—with some constraints on that shape being imposed only as it approaches the fastest possible times across the optical range. This configurability can enable useful and desired effects, such as creating optimal curves for fast autofocus algorithms.

There is, however, at least one algorithmic reason why it might be desirable to deviate (at least somewhat) from a linear optical power curve. If it is desired to have image samples across the optical range that are not evenly spaced, then a non-linear curve could best accommodate that goal. For example, as noted above, the hill climbing scenario could purposely take unevenly spaced samples in order to reduce the amount time spent in that portion of the optical power curve furthest away from the focus score peak.

Preferably, noise reduction techniques are used to prevent false focus score results (e.g. a false finding of "sharpness") due to the presence of noise in the image signal 8 caused by any aberrations and transitions of the TLCL as its optical power is changed. Such techniques are used to reduce the impact of, and/or actually discard, focus score readings that might include transient noise from the image sensor 6 that do not represent objects in the real image, and which could potentially drive the focus scores "through the roof" if not addressed. Noise reduction techniques can be implemented on the image signal 8 itself, and/or on the calculations made based upon the image signal 8. One noise reduction technique is the use of moving window averages, where each frame of data (or calculations therefrom) are averaged with data or calculated results from adjacent frames of data (those frames of data within a predetermined window). This averaging will reduce the negative impact of transient data or calculations that are only present in a few or even one frame of data. Another noise reduction technique (which could be employed in conjunction with the moving window averages technique) is the use of peak outlier rejection, where focus score data (or calculations therefrom) are discarded if the specific data point or calculation deviates from its immediate neighbors by some threshold. This technique potentially removes any negative impact of erroneous transient data (other than the loss of data or calculations for the discarded frame(s) of data).

The highest speed performance achievable by the AF system is also dictated by the speed of the photosensitive (frame rate) sensor 6. As mentioned above, the response of TLCL (and other CTLs) can sometimes deviate significantly from a linear curve when mapping time against optical power, greatly reducing in some stages of the curve the number of samples. However, if the frame rate of the sensor 6 is very high, the steepness of the curve may be acceptable in terms of effective sampling rates across the optical range. Even at the steepest portion of the curve, the number of samples may be great enough that between samples only a relatively small portion of the optical range is stepped over.

In addition, a very fast frame rate sensor may very well be able to sample the optical range in such small intervals that it may never be necessary to step backwards (particularly in a relaxation direction) to get to the peak of focus scores, even without predictive algorithms. That peak might readily be determined by either a very small dip from the highest score using the non-predictive hill climb algorithm, or by using a predictive algorithm whose predictions can be made exceedingly precise because of the robust sampling of the focus score curve. In either case, the final stopping place of the in flight algorithm may be so close to the actual peak of focus scores that it will be considered quite acceptable simply to acquire images from that point in the optical range, since the difference from ideal focus, if any, would not be regarded as perceptible.

Figure 7:
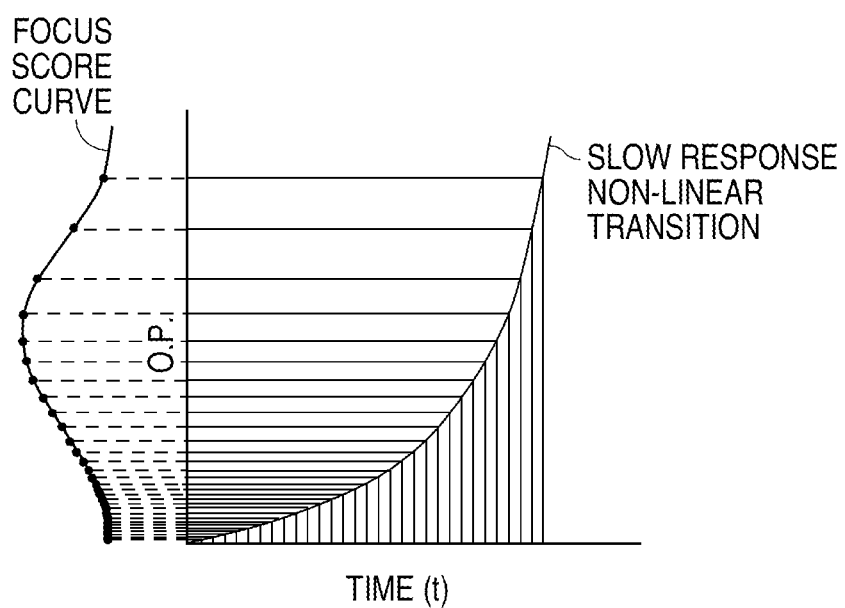
FIG. 7 is a graph illustrating a slow response non-linear progression of optical power over time for a fast frame rate sensor, and the corresponding focus scores for a middle field object.
Figure 8:
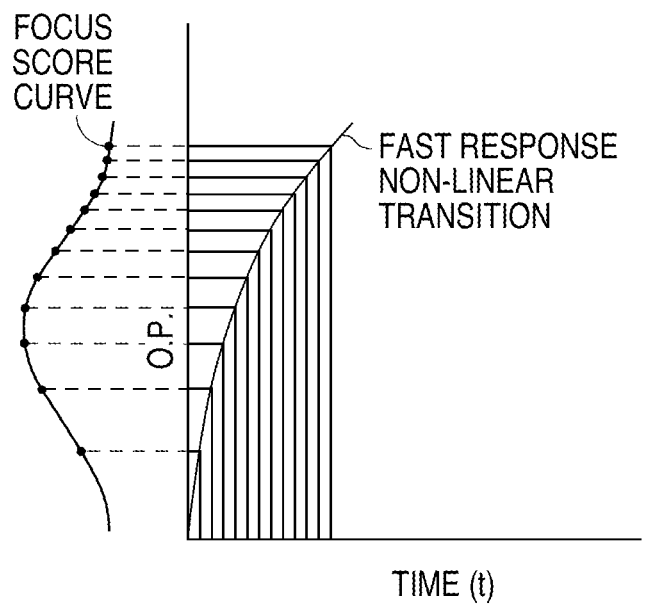
FIG. 8 is a graph illustrating a fast response non-linear progression of optical power over time for a fast frame rate sensor, and the corresponding focus scores for a middle field object.
Figure 9:
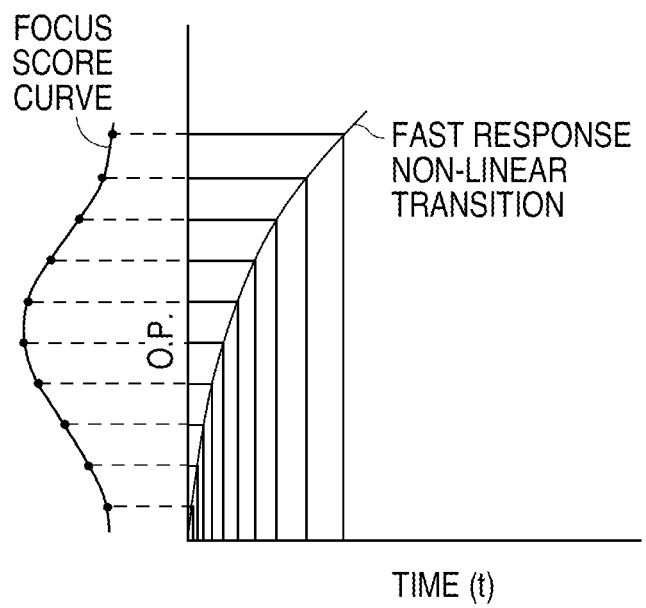
FIG. 9 is a graph illustrating a fast response non-linear progression of optical power over time for variable image acquisition spacings, and the corresponding focus scores for a middle field object.

A fast frame rate sensor would be compatible with non-linear optical power versus time curves, as illustrated in FIGS. 7 and 8. Despite the steepness and non-linearity of these curves, the sampling points are still sufficiently dense. In fact, it is conceivable that a frame rate sensor could be fast enough to allow the in flight algorithm to drive the TLCL as fast as physically possible and still have an acceptable level of aberrations (i.e. immediately set the drive voltage to its highest voltage). Such an optical power vs. time curve would be far from linear (see FIG. 8). Yet even under such circumstances, the sampling rate can be ample to be able to determine the peak of focus scores accurately, and stop the in flight algorithm quickly at, or very near, that peak. FIG. 9 illustrates how the timings of the image acquisitions can be unevenly spaced (in time) so that the spacing of the determined focus scores on the focus score curve are evenly spaced. This configuration would avoid needlessly measuring focus scores that are spaced very close together (i.e. to save on power consumption).

In general, with a fast frame rate sensor, the speed at which the TLCL may be driven, as well as more generally the shape of the curve of optical power to time, can be manipulated in fairly arbitrary ways so that the autofocus process can achieve various desirable ends. One desirable end is to reduce to a minimum the overall time required for autofocus. This may involve pushing the TLCL across the necessary portion of the optical range at the fastest (or approaching the fastest) speed possible that both allows that portion to be traversed while acquiring useful focus scores (i.e., focus scores that can be used to predict true focus quality at the various levels in the optical range) and allows the convergence at, or after, the end of that adjustment to a state where high quality, focused images can be acquired. The sampling ability of a fast frame sensor may also accommodate varying shapes of the optical power versus time curve under different operating conditions.

Another advantage of combining a TLCL with a fast frame rate sensor is that it allows the TLCL to travel through a number of planes of focus in a short period of time, provided that those planes of focus are relatively near, requiring relatively short adjustments in the optical power levels of the TLCL. This underlying ability to move through a number of neighboring planes of focus over a short period of time has several advantages. Because the changes in optical power and therefore planes of focus can be very small from one frame to the next, the movement of objects in the image can be reduced. From frame to frame, object movements in the image are going to be greatly minimized. This allows much better and easier correlation between images so that objects can be tracked, whether the movement in the objects is due to actual movement of the objects in the physical world, or due to changes in the positioning of the camera. Moreover, the camera can put together information from frames of neighboring planes of focus because each one of those frames is far less likely to exhibit motion blur. Motion blur is an especially troublesome issue in handheld devices in general, but for cell phone cameras in particular, since cell phones are not typically held with two hands when they are used to take a picture, and they are typically held toward the bottom (away from the camera lens toward the middle or top, exaggerating movements including shaking of the hand).

One way to achieve at least some of the effects of a fast frame rate sensor described above, even when the sensor may not be able to read out fill frames at a fast frame rate, is to create a region of interest over which focus scores are actually calculated which is much smaller than the entire frame, and simply not read out the entire contents of the frame. This depends mostly on the issue of whether accurate focus scores can be obtained by relatively short integration times over the pixels being examined. That is, if the pixels do not require a great deal of integration time to come to an accurate assessment of intensity information (essentially, something that reliably responds to enough photons so that accurate intensity levels can be determined), and the reading out of a frame is principally gated by the amount of time it takes to read out all pixels from the frame, then subsampling the frame to calculate the focus scores can speed up the determination of focus scores. Such a speed up may be enabled either when the sensor is very sensitive to light, or when there is sufficient light for a given sensor in a given scene that the integration time for pixels in the frame is appreciably less than the electronic readout of the entire frame.

The subsampling might include lines of pixels all contiguous in a given region, or portions of such lines, or these lines or portions themselves might not be contiguous, but themselves only a subset within a given region (which region may be the entire frame or anything smaller). Indeed, even non-contiguous pixels within a line might be employed, further reducing the number of pixels that need be read out, so long as enough pixels are read out in a relevant proximity to generate meaningful focus scores.

As mentioned, this manner of achieving fast frame rate response does not generally produce a full frame, and therefore the data read out can't be used generally to produce an image that is useful to display to the user of the camera (one exception, though, might be a case in which either the user is zooming in on an image, and/or one in which the user is in preview mode, and the pixels read out are sufficient to put together reasonable video). However, if the frame rate is already fast enough, it may be possible to put together acceptable video, either in the preview mode or to commit to a recorded or otherwise usable video, simply by skipping a certain number of subsampled frames used to obtain focus scores, and reading out the entire frame, or what is necessary from that frame, periodically so that the video composed of those frames (or sufficient subsamples) is itself acceptable.

With the in flight algorithm, once the peak in focus score is identified, the TLCL optical power is then set to that which corresponds to that peak. However, because the focus scores are determined without allowing the TLCL to settle at any given optical power and without any direct way of measuring the optical power when the peak focus score is achieved (or expected to be achieved), it can be difficult to determine the control vector needed to settle at the optical power for the peak focus score. What is known, however, is the reliable correlation between how much time has passed since the beginning of the optical power scan and the optical power. This correlation can be established for any given set of control vectors used to implement the optical power scan, and can even be established for each individual TLCL. Therefore, the in flight algorithm tracks the time that has elapsed since the beginning of the scan and the determined focus scores, and then uses the timing (or the predicted timing) of the peak focus score to determine which optical power generated (or is predicted to generate) that peak focus score (and the control vector needed to settle at the optical power). Said another way, the in flight algorithm maps the elapsed time of the scan to the optical power values achieved by the scan, and uses the elapsed times of the image acquisitions to determine which optical power value corresponds to the peak focus score and what drive signal is needed to get to that optical power value.

Variations in operating conditions (such as temperature, humidity, pressure, etc.) can introduce variances in the response time characteristics of the CTL (and TLCL in particular). Therefore, under certain conditions, the process of generating control vectors based upon scan timing may need to take into account the affects of environmental conditions and/or factors. The variation, and hence the errors in the response, can be corrected by modifying the control vectors appropriately. An alternate way of compensating for deviations in the response time can be to store response tables each tailored to a different combination of operating conditions, and to choose the correct response table after determining or sensing the operating conditions at issue.

Drive tables, as mentioned earlier, each consist of a table of entries, where each entry is composed of a sequence of control vectors that are designed to induce a certain sweep in the TLCL optical power. This sweep can be interrupted at any time by a calculation of the AF algorithm that the peak of focus scores has been reached or passed. As status above, for the in flight mode, there is a correlation between the amount of time that it has taken to reach and/or pass the peak focus, and the optical power of that peak. There can be a separate table that determines how to adjust from the various optical power levels at which the in flight mode algorithm might stop its travel across the optical range, to the optical power that corresponds to the actual or predicted peak. This may involve some interpolation between entries in the table in order to achieve the most accurate level.

There are a couple of accommodations that can be made to the drive tables to compensate for how operating conditions affect the response time of the TLCL. First, for each set of operating conditions (where each set includes one or more specific operating conditions that may affect the focusing operation) in the usable range, a specific table can be used for the initial activations across the optical range at that set of operating conditions. A minimum resolution in operating conditions will be used, and interpolation between these conditions can be utilized. Second, the table correlating time spent in the activation across the optical range to the optical power achieved at that time would be configured for each set of operating conditions. The AF algorithm would therefore use the operating conditions as a pointer into the correct table to converge on the accurate optical power. The operating conditions themselves can be monitored and measured using sensor(s) 18 to detect temperature, resistance, humidity, pressure, etc.

The principles described above are applicable to a wide range of AF search algorithms and in almost all cases can provide better AF convergence time performance. One other algorithm that provides a rigorous search is the so-called full search. In this case, the entire range of optical powers that a CTL can traverse, is searched and a determination of the best focus level made by choosing the highest focus score. The "in-flight" approach can be employed here by choosing the correct sweep regime (corrected for operating conditions) that sweeps the lens across the focus range in a predetermined response and focus scores are generated and stored in a table and indexed by a time stamp (or frame number corresponding the focus score). At the end of the sweep the focus score and hence the corresponding time stamp can be used to index into a previously stored response table that stores the Time vs. O.P. response of the TLCL corresponding to the chosen sweep regime and control vectors. From this the correct optical power is determined, and the appropriate control vector is chosen to adjust the lens to this optical power and thus achieving the desired focus.

An optional feature of cameras using a TLCL and a continuous in flight AF system is to keep and store (in memory 20) all the images captured near the peak focus score as the images are being acquired. At that point, the user (manually) or the system (automatically) can select which image to keep based upon focus scores or some other metric. Depending on the memory available, all of these images might be saved, or some subset of them only. For many situations, it may be sufficient simply to store that best image so far according to focus score or other metric, and compare that image, or its value on the metric, to the value on that metric of the newest incoming image. So, for example, one might simply save the image with the best focus score so far, compare it to the newest incoming image on focus scores, and keep the better of the two as the best so far. At the end of the sweep, the best image will have been selected. This sweep may stop at any time at which it is known that better images will not be encountered if the process were to continue—which would likely be the case if, say, the focus scores go into significant decline.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims. Components shown and described separately can be combined, and vice versa (e.g. the imaging signal processor 10 and the TL driver 14 can be two subcomponents of a single device).

What is claimed is:

1. A camera module, comprising:
a tunable liquid crystal lens including a dual-frequency liquid crystal layer configured to vary an optical power thereof in response to a drive signal applying an electrical field across said liquid crystal layer, said dual-frequency liquid crystal layer having liquid crystal molecules with a major axis thereof being attracted to align parallel to said electrical field and repulsed from said electric field as a function of drive signal frequency;
a drive circuit for generating the drive signal so that the tunable lens performs a focus scan of the optical power;
an image sensor configured to acquire light images passing through the tunable lens and to convert the light images to image signals during the focus scan;
a processor for generating focus scores of the acquired light images using the image signals during the focus scan, the processor being configured to determine from the focus scores a peak focus score achieved or achievable, and to instruct the drive circuit to adjust the drive signal so that the tunable lens substantially settles at a value of the optical power that corresponds to the peak focus score;
wherein the processor is configured to instruct the drive circuit to cause said axis of said liquid crystal molecules to be attracted to and to be repulsed from said electric field during said focus scan and subsequently to settle at the optical power value corresponding to the peak focus score.

2. The camera module of claim 1, wherein the processor is configured to determine a peak focus score achieved during the continuous focus scan, and to instruct the drive circuit to adjust the drive signal so that the tunable lens settles at a value of the optical power that corresponds to the peak focus score.

3. The camera module of claim 1, wherein the processor is configured to:
determine a peak focus score achieved during the focus scan by determining that rising focus scores begin to fall, and
instruct the drive circuit to cease the focus scan in response to the determined peak focus score and to adjust the drive signal so that the tunable lens settles at a value of the optical power that corresponds to the peak focus score.

4. The camera module of claim 1, wherein the drive circuit varies at least one of the following electrical parameters of the drive signal to control the optical power of the tunable lens: frequency, voltage amplitude, voltage duration, pulse amplitude, pulse duration, duty cycle, and signal amplitude or pulse width modulation.

5. The camera module of claim 1, wherein the dual-frequency tunable liquid crystal lens exhibits a substantially similar maximum scan speed of optical power in one direction as in an opposite direction, and the drive circuit is configured to generate the drive signal to perform the focus scan in either direction.

6. The camera module of claim 1, wherein the processor is configured to:
detect that the focus scores are rising during the focus scan;
predict from the rising focus scores a value of the optical power that will produce a peak focus score before the value of the optical power is reached in the focus scan; and
instruct the drive circuit to adjust the drive signal so that the tunable lens settles at the predictive value of the optical power.

7. The camera module of claim 6, wherein the processor is configured to perform the prediction by predicting at what point a slope of a tangent to a curve of the focus scores will reach zero.

8. The camera module of claim 1, wherein the drive signal is generated such that there is a linear relationship between scan time and optical power during the focus scan.

9. The camera module of claim 1, wherein the drive signal is generated such that there is a non-linear relationship between scan time and optical power during the focus scan, and timings of the light image acquisitions during the focus scan are unevenly spaced apart in time.

10. The camera module of claim 1, wherein the processor uses a portion, but not all, of each image for the generation of the focus scores.

11. The camera module of claim 1, further comprising:
a sensor for measuring an operating condition of the camera module, wherein the processor is configured to use the measured operating condition for the determination of the optical power value.

12. The camera module of claim 1, further comprising:
memory for storing drive tables, wherein each drive table includes a plurality of entries of control vectors that correlate the instructions from the processor to the drive circuit or the drive signal from the drive circuit to the tunable lens with at least one of the generated focus scores, the determined peak focus score, and the optical power of the tunable lens.

13. The camera module of claim 1, further comprising:
memory for receiving the image signals and storing the acquired light images, wherein the processor is configured to:
determine from the focus scores a peak focus score achieved, and
identify which of the acquired light images corresponds to the peak focus score.

14. The camera module of claim 13, wherein the processor is configured to instruct the memory to discard the stored light images except for the identified light image.

15. The camera module of claim 1, wherein the processor is configured to average each of the generated focus scores with adjacent focus scores.

16. The camera module of claim 1, wherein the processor is configured to identify any one of the generated focus scores that deviates from focus scores adjacent thereto by a predetermined threshold.

17. The camera module of claim 1, wherein the drive circuit is configured such that the adjustment of the drive signal includes temporarily producing at least one of an overdrive value and an underdrive value of the drive signal so that the tunable lens optical power changes toward the value of the optical power that corresponds to the peak focus score.

18. The camera module of claim 17, wherein the drive circuit is configured such that the adjustment of the drive signal includes temporarily producing a value of the drive signal that is different from, and applied before the application of, a final value of the drive signal that results in the settling at the value of the optical power that corresponds to the peak focus score.

19. A method of operating a camera module, comprising:
providing a tunable liquid crystal lens including a dual-frequency liquid crystal layer configured to vary an optical power thereof in response to a drive signal applying an electrical field across said liquid crystal layer, said dual-frequency liquid crystal layer having liquid crystal molecules with a major axis thereof being attracted to align parallel to said electrical field and repulsed from said electric field as a function of frequency;
generating the drive signal having a frequency using a drive circuit so that the tunable lens performs a focus scan of the optical power;
acquiring light images passing through the tunable lens and converting the light images to image signals during the focus scan using an image sensor;
generating focus scores of the acquired light images using a processor and the image signals during the focus scan;
determining from the focus scores a peak focus score achieved or achievable; and
adjusting the drive signal so that the tunable lens subsequently settles at a value of the optical power that corresponds to the peak focus score;
wherein the adjusting of the drive signal causes said axis of said liquid crystal molecules to be attracted to and repulsed from said electric field during said focus scan and subsequently to settle at the optical power value corresponding to the peak focus score.

20. The method of claim 19, further comprising:
determining a peak focus score achieved during the focus scan, and
adjusting the drive signal so that the tunable lens settles at a value of the optical power that corresponds to the peak focus score.

21. The method of claim 19, further comprising:
determining a peak focus score achieved during the focus scan by determining that rising focus scores begin to fall,
ceasing the focus scan in response to the determining of the peak focus score, and
adjusting the drive signal so that the tunable lens settles at a value of the optical power that corresponds to the peak focus score.

22. The method of claim 19, wherein the generating of the drive signal includes varying at least one of the following electrical parameters of the drive signal to control the optical power of the tunable lens: frequency, voltage amplitude, voltage duration, pulse amplitude, pulse duration, duty cycle, and signal amplitude or pulse width modulation.

23. The method of claim, wherein the dual-frequency tunable liquid crystal lens exhibits a substantially similar maximum scan speed of optical power in one direction as in an opposite direction, and wherein the drive signal is generated to perform the focus scan in either direction.

24. The method of claim 19, further comprising:
detecting that the focus scores are rising during the focus scan;
predicting from the rising focus scores a value of the optical power that will produce a peak focus score before the value of the optical power is reached in the focus scan; and
adjusting the drive signal so that the tunable lens settles at the predicted value of the optical power.

25. The method of claim 24, wherein the predicting includes predicting at what point a slope of a tangent to a curve of the focus scores will reach zero.

26. The method of claim 19, wherein the drive signal is generated such that there is a linear relationship between scan time and optical power during the focus scan.

27. The method of claim 19, wherein the drive signal is generated such that there is a non-linear relationship between scan time and optical power during the focus scan, and timings of the light image acquisitions during the focus scan are unevenly spaced apart in time.

28. The method of claim 19, wherein the generating of the focus scores is performed using a portion, but not all, of each image.

29. The method of claim 19, further comprising:
measuring an operating condition of the camera module using a sensor, wherein the determining of the optical power value is performed using the measured operating condition.

30. The method of claim 19, wherein the generating and adjusting of the drive signal includes using at least one drive table stored in a memory that includes a plurality of entries of control vectors that correlate values of the drive signal with at least one of the generated focus scores, the determined peak focus score, and the optical power of the tunable lens.

31. The method of claim 19, further comprising:
storing the converted light images in a memory device;
determining from the focus scores a peak focus score achieved; and
identifying which of the acquired light images corresponds to the peak focus score.

32. The method of claim 31, further comprising:
discarding the stored light images except for the identified light image.

33. The method claim 19, further comprising:
averaging each of the generated focus scores with adjacent focus scores.

34. The method of claim 19, further comprising:
identifying any one of the generated focus scores that deviates from focus scores adjacent thereto by a predetermined threshold.

35. The method of claim 19, wherein the adjusting of the drive signal includes temporarily producing at least one of an overdrive value and an underdrive value of the drive signal so that the tunable lens optical power changes toward the value of the optical power that corresponds to the peak focus score.

36. The method of claim 35, wherein the adjusting of the drive signal includes temporarily producing a value of the drive signal that is different from, and applied before the application of, a final value of the drive signal that results in the settling at the value of the optical power that corresponds to the peak focus score.

37. A camera module, comprising:
a tunable liquid crystal lens including a dual-frequency liquid crystal layer configured to vary an optical power thereof in response to a drive signal applying an electrical field across said liquid crystal layer, said dual-frequency liquid crystal layer having liquid crystal molecules with a major axis thereof being attracted to align parallel to said electrical field and repulsed from said electric field as a function of frequency;
a drive circuit for generating the drive signal having a frequency so that the tunable lens performs a focus scan of the optical power;
an image sensor configured to acquire light images passing through the tunable lens and to convert the light images to image signals during the focus scan; and
a processor for generating focus scores of the acquired light images using the image signals during the focus scan, wherein the processor being configured to determine from the focus scores a peak focus score achieved or achievable, and to instruct the drive circuit to adjust the drive signal to be a targeted stable drive signal so that the tunable lens subsequently settles at a value of the optical power that corresponds to the peak focus score;
wherein the processor is configured to instruct the drive circuit to cause said axis of said liquid crystal molecules to be attracted to and repulsed from said electric field so that the tunable lens optical power changes rapidly toward the value of the optical power that corresponds to the peak focus score, and then producing said targeted stable drive signal.

38. The camera module of claim 37, wherein the drive circuit is configured such that the adjustment of the drive signal includes temporarily producing at least one of an overdrive value and an underdrive value of the drive signal which is different than said targeted stable drive signal.

39. A method of operating a camera module, comprising:
providing a tunable liquid crystal lens including a dual-frequency liquid crystal layer configured to vary an optical power thereof in response to a drive signal applying an electrical field across said liquid crystal layer, said dual-frequency liquid crystal layer having liquid crystal molecules with a major axis thereof being attracted to align parallel to said electrical field and repulsed from said electric field as a function of frequency;
generating the drive signal having a frequency using a drive circuit so that the tunable lens performs a focus scan of the optical power;
acquiring light images passing through the tunable lens and converting the light images to image signals during the focus scan using an image sensor;
generating focus scores of the acquired light images using a processor and the image signals during the focus scan;
determining from the focus scores a peak focus score achieved or achievable; and
adjusting the drive signal to a targeted stable drive signal so that the tunable lens subsequently settles at a value of the optical power that corresponds to the peak focus score;
wherein the adjusting of the drive signal causes said axis of said liquid crystal molecules to be attracted to and repulsed from said electric field so that the tunable lens optical power changes rapidly toward the value of the optical power that corresponds to the peak focus score, and then producing said targeted stable drive signal.

40. The method of claim 39, wherein the adjusting of the drive signal includes temporarily producing at least one of an overdrive value and an underdrive value of the drive signal which is different than said targeted stable drive signal.

* * * * *

UNITED STATES PATENT AND TRADEMARK OFFICE
CERTIFICATE OF CORRECTION

PATENT NO. : 8,629,932 B2  
APPLICATION NO. : 12/542458  
DATED : January 14, 2014  
INVENTOR(S) : Tigran Galstian et al.

Page 1 of 1

It is certified that error appears in the above-identified patent and that said Letters Patent is hereby corrected as shown below:

In the Specification:

Column 1, line 61: "fill search" should read --full search--.
Column 9, line 18: "fill sweep" should read --full sweep--.

In the Claims:

Column 16, line 51: "claim, wherein" should read --claim 19, wherein--.

Signed and Sealed this
Twenty-eighth Day of October, 2014

Michelle K. Lee
*Deputy Director of the United States Patent and Trademark Office*